United States Patent [19]

Hammershaimb et al.

[11] Patent Number: 4,479,870

[45] Date of Patent: Oct. 30, 1984

[54] USE OF LIFT GAS IN AN FCC REACTOR RISER

[75] Inventors: Harold U. Hammershaimb, Western Springs; David A. Lomas, Arlington Heights, both of Ill.

[73] Assignee: JOP Inc., Des Plaines, Ill.

[21] Appl. No.: 584,681

[22] Filed: Feb. 29, 1984

[51] Int. Cl.$^3$ .................. C10G 11/20; C10G 11/18
[52] U.S. Cl. ................... 208/164; 208/113; 208/120; 208/153; 208/108
[58] Field of Search .............. 208/113, 108, 153, 164, 208/120

[56] References Cited

U.S. PATENT DOCUMENTS

| | | | |
|---|---|---|---|
| 2,575,258 | 11/1951 | Corneil et al. | 208/120 |
| 3,042,196 | 7/1962 | Payton et al. | 208/113 |
| 3,247,100 | 4/1966 | Haddad | 208/113 |
| 3,617,496 | 11/1971 | Bryson et al. | 208/80 |
| 3,617,497 | 11/1971 | Bryson et al. | 208/80 |
| 3,849,291 | 11/1974 | Owen | 208/78 |
| 3,894,932 | 7/1975 | Owen | 208/164 |
| 4,325,811 | 4/1982 | Sorrentino | 208/113 |
| 4,336,160 | 6/1982 | Dean et al. | 208/113 |
| 4,345,992 | 8/1982 | Washer et al. | 208/164 |
| 4,364,848 | 12/1982 | Castillo et al. | 252/417 |
| 4,376,038 | 3/1983 | Myers | 208/113 |
| 4,382,015 | 5/1983 | Castillo et al. | 252/417 |
| 4,404,090 | 9/1983 | Castillo et al. | 208/120 |
| 4,422,925 | 12/1983 | Williams et al. | 208/75 |
| 4,427,537 | 1/1984 | Dean et al. | 208/120 |
| 4,427,538 | 1/1984 | Bartholic | 208/127 |
| 4,427,539 | 1/1984 | Busch et al. | 208/127 |
| 4,431,515 | 2/1984 | Myers | 208/113 |
| 4,440,629 | 4/1984 | Stine | 208/108 |

Primary Examiner—Delbert E. Gantz
Assistant Examiner—Anthony McFarlane
Attorney, Agent, or Firm—William H. Page, II; Louis A. Morris

[57] ABSTRACT

A process for converting normally liquid hydrocarbons with an active fluid catalytic cracking catalyst which comprises:

(a) passing an upflowing suspension of hot regenerated active fluid catalytic cracking catalyst in a lift gas comprising hydrocarbons including not more than 10 mole % $C_3$ and heavier hydrocarbons through a lower portion of a vertically orientated riser conversion zone at a velocity of from about 1.8 to less than 12.2 meters per second, and for a residence time from about 0.5 to about 15 seconds, the ratio of catalyst to hydrocarbon in said lift gas being greater than 80; and (b) introducing the normally liquid hydrocarbons into the upflowing suspension at a locus in the riser conversion zone downstream of the lower portion to form a catalyst-hydrocarbon mixture wherein the temperature and residence time are sufficient to effect the desired conversion.

The process is particularly useful for the treatment of a heavy residual feedstock.

6 Claims, No Drawings

USE OF LIFT GAS IN AN FCC REACTOR RISER

BACKGROUND OF THE INVENTION

1. Field of the Invention

The field of art to which the claimed invention pertains is the catalytic cracking of hydrocarbons. More specifically, the claimed invention relates to a process for the fluid catalytic cracking of hydrocarbons where gaseous material is introduced into the reactor riser upstream of the introduction of the feed stream to be cracked.

2. Background Information

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking (FCC) process for the conversion of relatively high-boiling hydrocarbons to lighter hydrocarbons boiling in the heating oil or gasoline (or lighter) range. The hydrocarbon feed is contacted in one or more reaction zones with the particulate cracking catalyst maintained in a fluidized state under conditions suitable for the conversion of hydrocarbons.

There are many references which teach, for various reasons, the mixing of hot regenerated FCC catalyst with various relatively light materials prior to contact of the catalyst with the FCC feedstock. Thus, in U.S. Pat. No. 3,042,196 to Payton et al., beginning with a light cycle oil, progressively heavier components are added to an upflowing catalyst stream in a reactor riser so as to use a single catalyst and a single cracking zone to convert the elements of a crude oil. In U.S. Pat. No. 3,617,497 to Bryson et al. a light gas oil is mixed with a diluent vapor such as methane or ethylene at or near the bottom of a reactor riser with hot regenerated catalyst, introduced at the same point in the riser or very close downstream, with the mixture then contacted with heavy gas oil at the top of the riser so as to enhance gasoline yield. In U.S. Pat. No. 3,706,654 to Bryson et al., naphtha diluent may be added to the bottom of a reactor riser to aid in carrying upwardly into the riser the regenerated catalyst stream. In U.S. Pat. No. 3,849,291 to Owen it is disclosed that a gasiform diluent material comprising $C_{4+}$ hydrocarbons and particularly $C_{5+}$ hydrocarbons may be used to form a suspension with freshly regenerated catalyst which suspension is caused to flow through an initial portion of a riser reactor before bringing the hydrocarbon reactant material in contact therewith in a downstream portion of the reactor so as to achieve a very short residence time (1 to 4 seconds) that the hydrocarbon is in contact with the catalyst suspension in the riser reactor (catalyst residence time). U.S. Pat. No. 3,894,932 to Owen discusses contacting the FCC conversion catalyst with a $C_3$-$C_4$ rich hydrocarbon mixture or an isobutylene rich stream before contact with gas oil boiling range feed material in an initial portion of the riser (catalyst to hydrocarbon weight ratio from 20 to 80) so as to upgrade the $C_3$-$C_4$ material to a higher boiling material. U.S. Pat. No. 4,422,925 to Williams et al. discusses passing a mixture of hydrocarbons, such as ethane, propane, butane, etc., and catalyst up through a riser reactor at an average superficial gas velocity within the range from about 40 to about 60 feet per second (12.2–18.3 meters/sec), with a catalyst to hydrocarbon weight ratio of about 5 to about 10 so as to produce normally gaseous olefins. In U.S. Pat. No. 4,427,537 to Dean et al. there is shown catalyst particles mixed with a fluidizing gas, such as a gaseous hydrocarbon, charged to a bottom portion of a reactor riser to promote or provide for a smooth non-turbulent flow up the riser of a relatively low velocity dense flow of catalyst particles.

There are additional references which show use of a lift gas in non-catalytic systems. For example, in U.S. Pat. No. 4,427,538 to Bartholic, a gas which may be a light hydrocarbon is mixed with an inert solid at the bottom part of a vertical confined conduit and a heavy petroleum fraction is introduced at a point downstream so as to vary the residence time of the petroleum fraction in the conduit. Similarly, in U.S. Pat. No. 4,427,539 to Busch et al., a $C_4$ minus gas is used to accompany particles of little or no catalytic activity up a riser upstream of charged residual oil so as to aid in dispersing the oil.

Finally, it is taught in U.S. Pat. Nos. 4,364,848, 4,382,015, and 4,404,090 to Castillo et al. and U.S. Pat. No. 4,325,811 to Sorrentino that passivation of contaminating metals on an FCC catalyst may be effected by contacting hot regenerated catalyst with hydrogen and/or light hydrocarbon gas.

The process of the present invention, in contradistinction to the teachings of the above references, comprises a unique combination of reaction conditions and lift gas composition to achieve a combination of effects not heretofore realized.

SUMMARY OF THE INVENTION

The primary objective of the present invention is to realize the maximum advantage in an FCC process, particularly with regard to product yields, when using a lift gas in the reactor riser.

In its broadest enbodiment, the present invention comprises a process for converting normally liquid hydrocarbons with an active fluid catalytic cracking catalyst which comprises: (a) passing an upflowing suspension of hot regenerated active fluid catalytic cracking catalyst in a lift gas comprising hydrocarbons including not more than 10 mole % $C_3$ and heavier hydrocarbons through a lower portion of a vertically orientated riser conversion zone at a gas velocity of from about 1.8 to less than 12.2 meters per second, and for a catalyst residence time from about 0.5 to about 15 seconds, the weight ratio of catalyst to hydrocarbon in the lift gas being greater than 80; and (b) introducing the normally liquid hydrocarbons into the upflowing suspension at a locus in the riser conversion zone downstream of the lower portion to form a catalyst-hydrocarbon mixture wherein the temperature and residence time are sufficient to effect the desired conversion.

Other embodiments of the present invention encompass details as to lift gas compositions and reaction conditions, all of which are hereinafter disclosed in the following discussions of each of the facets of the present invention.

DESCRIPTION OF THE INVENTION

Catalysts which can be used in the process of this invention include those known to the art as fluidized catalytic cracking catalysts. Specifically, the high activity crystalline aluminosilicate or zeolite-containing catalysts can be used and are preferred because of their higher resistance to the deactivating effects of high temperatures, exposure to steam, and exposure to metals contained in the feedstock. Zeolites are the most commonly used crystalline aluminosilicates in FCC.

This invention is particularly useful for FCC units processing heavy or residual charge stocks, i.e., those boiling above 900° F., which frequently have a high metals content and which cause a high degree of coke deposition on the catalyst when they crack. Contaminant metals such as nickel, iron, cobalt and vanadium found in the charge stock usually influence the regeneration operation, catalyst selectivity, catalyst activity and the fresh catalyst makeup required to maintain a constant activity. Metals contained in the feed are deposited on the catalyst and not only change its selectivity in the direction of less gasoline and more coke and light gas in a given reactor system but tend to deactivate the catalyst.

In a typical FCC process flow, finely divided regenerated catalyst leaves the regeneration zone at a certain temperature and contacts a feedstock in a lower portion of a reactor riser zone. While the resulting mixture, which has a temperature of from about 200° C. to about 700° C., passes up through the riser, conversion of the feed to lighter products occurs and coke is deposited on the catalyst. The effluent from the riser is discharged into a disengaging space where additional conversion can take place. The hydrocarbon vapors, containing entrained catalyst, are then passed through one or more cyclone separation means to separate any spent catalyst from the hydrocarbon vapor stream. The separated hydrocarbon vapor stream is passed into a fractionation zone known in the art as the main column wherein the hydrocarbon effluent is separated into such typical fractions as light gases and gasoline, light cycle oil, heavy cycle oil and slurry oil. Various fractions from the main column can be recycled along with the feedstock to the reactor riser. Typically, fractions such as light gases and gasoline are further separated and processed in a gas concentration process located downstream of the main column. Some of the fractions from the main column, as well as those recovered from the gas concentration process may be recovered as final product streams. The separated spent catalyst passes into the lower portion of the disengaging space and eventually leaves that zone passing through stripping means in which a stripping gas, usually steam, contacts the spent catalyst purging adsorbed and interstitial hydrocarbons from the catalyst. The spent catalyst containing coke leaves the stripping zone and passes into a regeneration zone where, in the presence of fresh regeneration gas and at a temperature of from about 620° C. to about 760° C., a combustion of coke produces regenerated catalyst and flue gas containing carbon monoxide, carbon dioxide, water, nitrogen and perhaps a small quantity of oxygen. Usually, the fresh regeneration gas is air, but it could be air enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, which is the preferred mode of operation, the flue gas passes directly to sensible heat recovery means and from there to a refinery stack. Regenerated catalyst which was separated from the flue gas is returned to the lower portion of the regeneration zone which typically is maintained at a higher catalyst density. A stream of regenerated catalyst leaves the regeneration zone, and as previously mentioned, contacts the feedstock in the reaction zone.

One of the major obstacles in the processing of FCC feedstocks, such as residual stocks, is the deposition of excessive amounts of coke on the catalyst with associated high gas yields. These excessive amounts of coke and gas create what are sometimes insurmountable problems such as exceeding the regenerator capacity as well as the capacity of the gas concentration facilities. Another problem with these types of feedstocks, which are usually contaminated with the aforementioned undesirable metal contaminants, is the harmful influence of even minute amounts of these metals. These metals, and in particular nickel and vanadium, will contribute an undesirable activity to the catalyst on which they deposit which is responsible for the production of still more hydrogen and coke on the catalyst. The presence of large quantities of these metals may also block access to cracking sites and thus lower the activity of the catalyst.

The present invention achieves minimization of the above undesirable characteristics inherent in the use of heavy or residual charge stocks by a very careful orchestration of the use of a lift gas, its composition, the velocity and residence time of the lift gas and catalyst up the riser and the ratio of the catalyst to hydrocarbon in the lift gas, the combination of all of which provides a surprising and unexpected combination of benefits. The presence alone of the lift gas will effect reductions of the heavy hydrocarbon partial pressure which will in turn reduce coke deposition to some extent. However, the right amount of lift gas (catalyst to lift gas hydrocarbon ratio) and the velocity of lift gas and catalyst up the riser will serve to tailor the temperature of the catalyst prior to feed introduction by sensible heat and reaction effects, and to provide acceleration of the catalyst in the direction of gas flow so that the catalyst is moving at a significant velocity by the time feed is introduced, thereby providing benefits in terms of improved catalyst/heavy oil contacting, improved distribution, reduced catalyst residence time and reduced catalyst backmixing. The most critical parameter of the present invention to realize these last mentioned benefits is a gas velocity of from about 1.8 to less than 12.2 meters per second up the riser. The velocity of the lift gas may be easily adjusted, independent of the catalyst to hydrocarbon in lift gas ratio, by the inclusion therein of up to 80 mole % water (steam).

The lift gas used in the present invention also performs the important function of reacting with the catalyst prior to feedstock introduction so as to enhance desired and suppress undesired catalytic properties. Specifically, we have found that a lift gas comprising hydrocarbons including not more than 10 mole % $C_3$ and heavier hydrocarbons will selectively carbonize active contaminating metal sites on the catalyst to reduce the hydrogen and coke production effects of these metal sites, and will selectively carbonize acid sites on the catalyst, thus leading to greater selectivity and lower coke and gas yield from a heavy hydrocarbon charge. Other reaction species may be present in the lift gas, such as $H_2$, $H_2S$, $N_2$, CO and/or $CO_2$. The critical parameters, besides lift gas composition, to realize these benefits are a catalyst residence time in the lower portion of the riser, prior to feed introduction, of from about 0.5 to about 15 seconds and a weight ratio of catalyst to hydrocarbon in the lift gas greater than 80. There, of course, is also a minimum hydrocarbon content in the lift gas, the value of which would depend primarily on characteristics of the feedstock, such as metals content and vapor pressure.

Notwithstanding anything implied in the above to the contrary, however, it is strongly emphasized that the lift gas composition and catalyst to lift gas hydrocarbon ratio have, to some extent, a direct effect on the cracking reactions in the riser downstream of the feed introduction, and the catalyst-lift gas velocity, upstream of the feed introduction, to a certain degree, will also influence the cracking reactions. The point is that the entire reactor riser, upstream and downstream of where the feed is introduced, is an integrated system and all the parameters defining the present invention alone and in combination have direct and indirect effects on all reactions occurring throughout that system.

Although no opinion is herein rendered as to which, if any, of the references mentioned in the above Background Information discussion, might be considered "prior art", it is clear that no such reference suggests the particular critical combination of compositions and conditions which define the mets and bounds of the present invention. Many of these references disclose what arguably might be considered a lift gas, but which is far heavier than a lift gas including not more than 10 mole % $C_3$ and heavier hydrocarbons as required by the present invention. Thus, the Payton et al., Bryson et al. (U.S. Pat. No. 3,706,654), and Owen (both references) there is taught pre-contact of catalyst with materials ranging in weight from "$C_3$-$C_4$ rich" to light cycle oil. These heavier materials, however, are precluded in the practice of the present invention at least because they enable neither the desired passivation effects nor proper feed vapor pressure adjustments.

On the other hand, those references which disclose the use of a very light hydrocarbon gas to be mixed with hot regenerated catalyst are either silent as to the critical conditions required by the present invention or themselves require conditions contrary to the express requirements of the present invention. Thus, in Bryson et al. (U.S. Pat. No. 3,617,497) the diluent vapor is either mixed with the catalyst at the same time as with the light gas oil or very soon thereafter, in contradistinction to the catalyst-lift gas residence time of from about 0.5 to about 15 seconds required by the present invention. In Williams et al., there may be a mixture of light hydrocarbon gas and catalyst passed up the riser, but the velocity is in the range from about 12.2 to about 18.3 meters per second, as compared to about 1.8 to less than 12.2 meters per second required by the present invention, and the catalyst to hydrocarbon weight ratio of Williams et al. is from about 5 to about 10, as compared to the ratio of greater than 80 as required by the present invention. In Dean et al., the catalyst and hydrocarbon are charged so as to obtain low velocity, non-turbulent dense flow (estimated by one skilled in the art to be less than 0.9 meters per second) as compared to the relatively high velocity required by the present invention, which is observed to result in a turbulent dilute flow.

The non-catalytic systems of Bartholic and Busch et al. clearly bear little relevance to the present invention which requires an active fluid catalytic cracking catalyst and the purpose of which, to a large part, is the control and modification of the catalytic properties.

The Castillo et al. patents and Sorrentino patent recognize the utility of light hydrocarbon gasses for the passivation of contaminating metals on FCC catalyst. None of these references, however, give any hint to the employment of the passivating gas in the reactor riser as a lift gas upstream of the introduction of feed. To the contrary, these references recommend the use of a passivation zone separate from the reactor riser, such as a vessel in the catalyst dipleg line between the regenerator and reactor.

The present invention is considered particularly useful for FCC chargestocks such as vacuum gas oil and residual stocks having high metals content. There are many possible sources of a suitable lift gas in the typical refinery, but two convenient sources would be well known to those skilled in the art as absorber gas from the FCC gas concentration facilities, or gas from the main column overhead receiver after it has been compressed through at least one stage of a compressor followed by cooling.

The reactor riser configuration for practice of the process of the present invention in its simplest form would comprise a vertical conduit with lift gas injected into the bottom, hot regenerated catalyst flowing into the lift gas slightly above the point of lift gas injection and the feed injected at an appropriate point further downstream. Another possibility would be for the lift gas and catalyst to flow up an annular portion of a riser, the feed to flow co-currently up the central portion and the annular and central portions merging at the locus where it is appropriate for the feed and catalyst to be mixed.

The following non-limiting example is illustrative of FCC operations in accordance with the process of our invention as compared with operations not using a lift gas and using a lift gas not within the scope of the present invention.

EXAMPLE

For this example the process of the present invention was used in a first run followed by a run in which the lift gas used was of a composition including heavy components which removed the process illustrated by that run from the scope of the present invention. Following is the data for those two runs including relevant operating conditions. The feedstock for both runs was an atmospheric resid. Also included, for purposes of comparison, is the predicted operation (hypothetical run No. 3) that we believe is an accurate representation of results that would be obtained using no lift gas and a feedstock and conditions, where applicable, identical to the first run.

| Run | 1<br>Present<br>Invention | 2<br>Heavy<br>Lift Gas | 3<br>Predicted |
|---|---|---|---|
| Feedstock | — | Atmospheric Resid | — |
| Lift Gas (mol % dry basis) | | | N.A. |
| $N_2$ | 6.0 | 5.6 | " |
| CO | 1.1 | trace | " |
| $CO_2$ | 1.3 | 0.7 | " |
| $H_2S$ | 2.9 | — | " |
| $H_2$ | 19.8 | 18.4 | " |
| $C_1$ | 35.2 | 14.0 | " |
| $C_2$ (total) | 24.0 | 14.2 | " |

-continued

| Run | 1 Present Invention | 2 Heavy Lift Gas | 3 Predicted |
|---|---|---|---|
| $C_3$ (total) | 5.0 | 19.5 | " |
| $C_4$ (total) | 4.1 | 18.0 | " |
| $C_5$ (total) | 0.6 | 9.6 | " |
| $H_2O$ (mol % of lift gas) | 50.0 | 50.0 | " |
| Conditions | | | |
| Gas Velocity up riser (m/sec) | 5.79 | 5.79 | |
| Catalyst Residence time, lower portion (sec) | 11 sec | 11 sec | |
| Catalyst/lift gas hydrocarbon (kg/kg) | 400 | 400 | |
| Yields | | | |
| Dry gas (wt. %) | 2.6 | 6.6 | 4.7 |
| $C_3 + C_4$ (LV %) | 22.5 | 14.5 | 22.3 |
| Gasoline (380° F. w 90%, LV %) | 56.1 | 56.3 | 55.8 |
| Light cycle oil (LV %) | 15.8 | 17.5 | 14.3 |
| Clarified oil (LV %) | 11.4 | 8.9 | 10.3 |
| Coke (wt. %) | 10.0 | 11.3 | 10.2 |

The above data shows the criticality of the lift gas composition having no more than a small amount of heavier components. The increases in dry gas and coke yield with the use of the heavier lift gas is quite pronounced. We believe that the yields of gasoline and light cycle oil obtained by the practice of the present invention could be improved without significantly increasing coke or dry gas make, by further optimization of the process.

The predicted results which are based on our empirical understanding of the conventional FCC process through many years of experience in the FCC art indicate an unexpected improvement through the use of lift gas, certainly from the standpoint of gas and coke make and even with regard to the yields of gasoline and light cycle oil.

We claim as our invention:

1. A process for converting normally liquid hydrocarbons with an active fluid catalytic cracking catalyst which comprises:
   (a) passing an upflowing suspension of hot regenerated active fluid catalytic cracking catalyst in a lift gas comprising hydrocarbons including not more than 10 mole % $C_3$ and heavier hydrocarbons through a lower portion of a vertically orientated riser conversion zone at a gas velocity of from about 1.8 to less than 12.2 meters per second, and for a catalyst residence time from about 0.5 to about 15 seconds, the weight ratio of catalyst to hydrocarbon in said lift gas being greater than 80; and
   (b) introducing said normally liquid hydrocarbons into said upflowing suspension at a locus in said riser conversion zone downstream of said lower portion to form a catalyst-hydrocarbon mixture wherein the temperature and residence time are sufficient to effect the desired conversion.

2. The process of claim 1 wherein said lift gas comprises from about 0 to about 80 mole % steam.

3. The process of claim 1 wherein said hot regenerated active fluid catalytic cracking catalyst is obtained from a fluid catalytic cracking unit regenerator and is at a temperature from about 620° C. to about 760° C.

4. The process of claim 1 wherein said lift gas also contains quantities of $H_2$, $H_2S$, $N_2$, CO or $CO_2$.

5. The process of claim 1 wherein said normally liquid hydrocarbon comprises a heavy residual feedstock.

6. The process of claim 1 wherein said lower portion of said vertically orientated riser comprises an annular space wherein said catalyst and lift gas suspension flows upwardly, said normally liquid hydrocarbons flowing co-current to said suspension up the central space of said riser, said annular and central spaces merging at the locus appropriate to the introduction of said normally liquid hydrocarbons into said upflowing suspension.

* * * * *

UNITED STATES PATENT AND TRADEMARK OFFICE
CERTIFICATE OF CORRECTION

PATENT NO. : 4,479,870
DATED : Oct. 30, 1984
INVENTOR(S) : Harold U. Hammershaimb et al.

It is certified that error appears in the above-identified patent and that said Letters Patent is hereby corrected as shown below:

On the first page, please change the Assignee from "JOP Inc." to --UOP Inc.--.

Signed and Sealed this

Seventh Day of May 1985

[SEAL]

Attest:

DONALD J. QUIGG

Attesting Officer     Acting Commissioner of Patents and Trademarks